Patented July 1, 1930

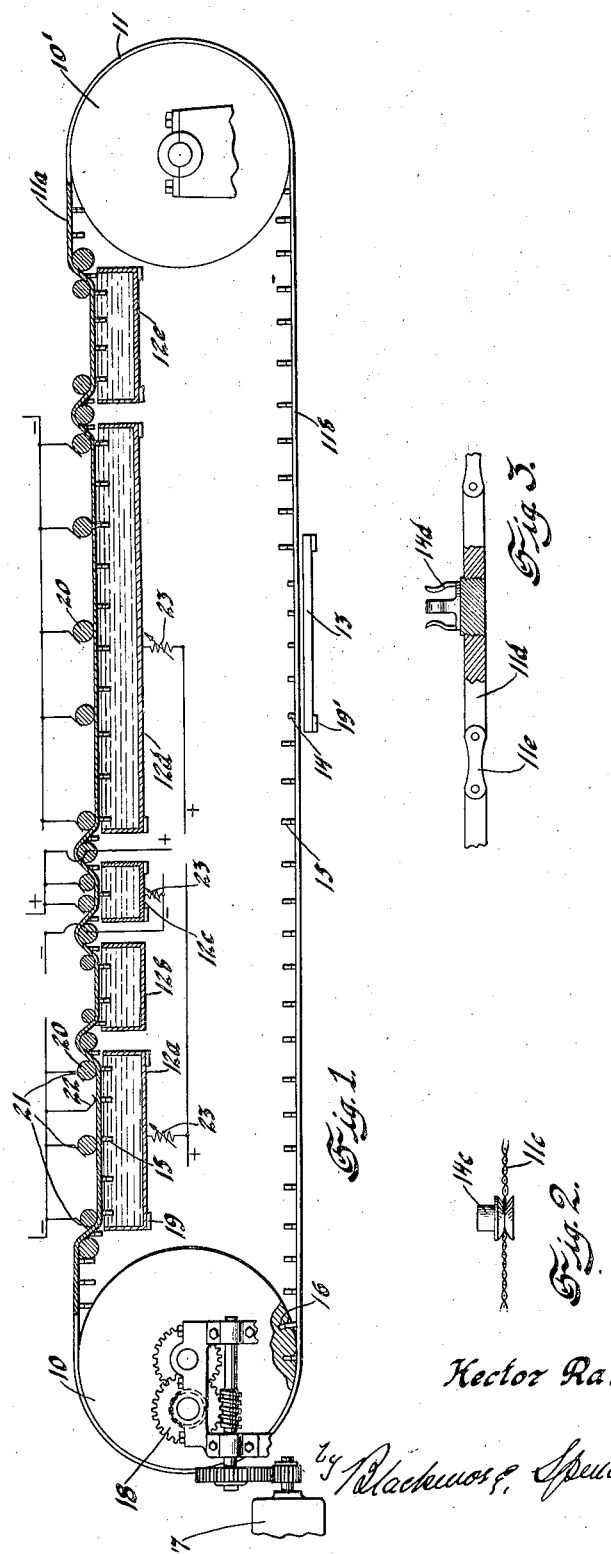

1,769,188

UNITED STATES PATENT OFFICE

HECTOR RABEZZANA, OF FLINT, MICHIGAN, ASSIGNOR TO A C SPARK PLUG COMPANY, OF FLINT, MICHIGAN, A COMPANY OF MICHIGAN

AUTOMATIC PLATING MACHINE

Application filed November 2, 1928. Serial No. 316,698.

Although the present invention has been somewhat broadly entitled, its primary object is to provide simple and convenient means for the conditioning and/or application of a coating of chromium, or the like, to numerous small articles or pieces,—such as the so-called "first-worm shafts" of speedometers; and a typical installation, suitable for the purpose referred to, may comprise one or more tanks adapted to contain an electrolyte or electrolytes and so positioned as to permit the return lap of a piece-carrying belt to pass therebelow, in a manner favorable to the loading and unloading of said return lap.

This invention preferably makes use of a belt which is either transversely or longitudinally conductive (or both); said belt may be contacted by pulleys and/or brushes connected to a source of electric current and also by pulleys (including a drive pulley and a companion pulley at or near opposite ends of an installation) whose material and/or mode of support precludes or restricts electric conduction therethrough; and one of the last-mentioned pulleys is preferably so constructed or equipped as incidentally to assure a correct positioning and a secure retention of the mentioned articles or pieces upon said belt; but complete details and minor objects of this invention may be best understood from the description of an illustrative embodiment thereof, taken in connection with the appended claims and the accompanying drawings.

In the drawings:

Fig. 1 is a diagrammatic elevational view, with some parts omitted and with other parts shown in section.

Figs. 2 and 3 are detail views in the nature of diagrammatic elevations, with parts broken away.

Referring to the details of the illustrated embodiment of the present invention, a drive pulley 10 and a companion pulley 10' are shown in Fig. 1 as terminally positioned with reference to the respective laps of a belt 11; an upper lap 11ª of said belt is shown as passing above a plurality of tanks 12ª, 12ᵇ, 12ᶜ, 12ᵈ and 12ᵉ; and a lower lap 11ᵇ of said belt is shown as passing below said tanks and in proximity to a loading and unloading station 13. The belt 11 is provided with a set of suitably spaced piece-receiving sockets or equivalent elements 14, adapted removably to retain any articles or "pieces" 15 to be conditioned and/or plated. The respective pulleys 10, 10' must obviously be so constructed as to permit the pieces 15 to be retained by the piece-receiving elements 14; and, for the purpose here referred to, the drive pulley 10, or its equivalent, may be provided with peripheral or transverse channels 16, or the like, so spaced and shaped as to assure an application of pressure to said pieces, tending to so secure the same, upon said belt as to insure any desired conduction thereto during the advance of said pieces through the mentioned tank or tanks.

The pulley 10 may be rotated, at a slow speed, by means comprising a motor 17 and a reduction gearing 18; but the details of these devices will be understood to be comparatively immaterial. The longitudinal dimensions of the mentioned tank or tanks referred to are intended to be such, as compared with the rate of advance of belt 11, as to assure the exposure of the articles 15 to electrolytic and/or washing or other effects, within said tanks, for periods respectively suitable to the conditioning and/or plating of said articles; and, in preferred embodiments of this invention, the upper lap 11ª of the mentioned belt may be provided with means serving not only for the conduction of electrical current thereto, or to the mentioned piece-receiving elements 14, but also for the guidance of said belt at such a distance above the level of the respective liquids in said tanks as to assure the desired immersion of the pieces 15 therein.

Tanks 12ª, 12ᶜ and 12ᵈ, assuming these to be intended for use in the execution of electrolytic steps, may advantageously be isolated from one another and provided with insulating supports 19, adapting said tanks to serve as electrodes; and small pulleys or rollers 20, shown as contacted by brushes 21, and/or brushes 22 directly engaging the upper lap 11ª of belt 11, may be employed not only to afford guidance to said belt but to conduct electricity thereto or therefrom in such a manner that the pieces 15, during their submersion, may serve as electrodes having opposite polarity from the respective tanks above which they are disposed.

In case the belt 11 is intended to be maintained at a uniform potential throughout its length, said belt may advantageously be formed from, or comprise strands of, a conductive material such as copper wire, somewhat as suggested at 11$^c$, Fig. 2,—piece-carrying elements 14$^c$ being secured thereto by riveting or in any suitable manner,—permitting the same to pass the mentioned pulleys, brushes and/or rollers. On the other hand, in case different parts of the mentioned belt are to be maintained at different potentials, during the advance thereof, conductive links 11$^d$ may be so associated with non-conductive links 11$^e$ as to permit a transverse conduction through piece-receiving elements 14$^d$, although precluding longitudinal conduction. The latter mode of construction may imply a comparatively close spacing of the conductive pulleys or rollers 20; but it will be understood that, in the respect referred to, as in most other respects, the present showing is purely diagrammatic.

The loading station 13 is shown as supported by insulating elements 19'; and, during the employment of the described organization in chromium plating, assuming the tank 12$^a$ to contain a cleaning solution (to which the pieces may be exposed for a period such as five minutes) and the tank 12$^d$ to contain a plating solution (to which the same pieces may be subsequently exposed for a period such as ten minutes), the tank 12$^c$ may contain a so-called "stripping" solution,—of such composition as to obviate the necessity for any washing or rinsing of pieces incidentally to their transfer from tank 12$^c$ to tank 12$^d$. The direction of current through tank 12$^c$ may be opposite that of 12$^d$,—the plus sign and the minus sign being so applied, in Fig. 1, as to indicate that the pieces 15 may ordinarily serve as cathodes during their passage through tanks 12$^a$ and 12$^d$, but as anodes during their passage through 12$^c$, the belt being then at an intermediate potential. The respective tanks 12$^a$, 12$^c$ and 12$^d$ are shown as provided with separately variable resistances 23; but it will be understood that, as is usual in installations of the general type here referred to, not only the mentioned resistances but suitable switches, ammeters and/or other instruments may be assembled, for convenient access, upon a switch board, not shown; and the adjustment of the mentioned resistances, as well as the voltages and density of current employed, must depend upon the character of the electrolytes in the respective tanks and the intended effects thereof. The tank 12$^b$ may ordinarily receive a continuous flow of cold water and tank 12$^e$ may ordinarily receive a continuous flow of hot water; but no means of replenishment is shown in connection with any of the mentioned tanks, such means being well known and immaterial to the present invention.

Although the foregoing description has included complete details of but one general organization, alternative types of conductive belting being suggested in Figs. 2 and 3, it should be understood not only that various features of this invention are capable of independent use but also that numerous modifications thereof might easily be devised, without the slightest departure from the spirit and scope of this invention.

I claim:

1. In an organization suitable for use in chromium-plating numerous separate pieces: a pair of pulleys so formed and positioned as to permit the interposition of a tank therebetween; a belt, including conductive material and extending over said pulleys, one lap of said belt passing above said tank and a return lap thereof passing below said tank; and work-receiving elements so secured to said belt as to extend upward from said return lap, favorably to the positioning of pieces to be plated thereon.

2. In an organization suitable for use in chromium-plating numerous separate pieces: a pair of pulleys, so formed and positioned as to permit the interposition of a tank therebetween; a belt, including conductive material and extending over said pulleys, one lap of said belt passing above said tank and a return lap thereof passing below said tank; and work-receiving elements so secured as to extend upward from said return lap, favorably to the positioning of pieces to be plated thereon,—said laps being spaced apart by a vertical distance exceeding the height of said tank and sufficient to permit a downward positioning of said pieces thereon.

3. In an organization suitable for use in chromium-plating numerous separate pieces: a pair of pulleys so formed and positioned as to permit the interposition of a tank therebetween; a belt including conductive material and extending over said pulleys, one lap of said belt passing above said tank and a return lap thereof passing below said tank; and work-receiving elements so secured as to extend upward from said return lap favorably to the positioning of pieces to be plated thereon,—said belt being provided with current supply devices which are effective also to depress the same toward said tank sufficiently to immerse said pieces.

4. In an organization suitable for use in chromium-plating numerous separate pieces: a pair of pulleys so formed and positioned as to permit the interposition of a tank therebetween; a belt including conductive material and extending over said pulleys, one lap of said belt passing above said tank and a return lap thereof passing below said tank; and work-receiving elements so secured as to extend upward from said return lap, favorably to the positioning of pieces to be plated thereon,—said belt being provided with current supply devices which are effective also to depress the same toward said tank sufficiently to immerse said pieces, and with means for elevating the same near the ends of said tank.

5. In an organization suitable for use in chromium-plating numerous separate pieces: a pair of pulleys so formed and positioned as to permit the interposition of a tank therebetween; a belt including conductive material and extending over said pulleys, one lap of said belt passing above said tank and a return lap thereof passing below said tank; and work-receiving elements so secured as to extend upward from said return lap, favorably to the positioning of pieces to be plated thereon,—said pulleys being so formed as to assure a desired relationship between said work-receiving elements and said pieces.

6. In an organization suitable for use in chromium-plating numerous separate pieces: a pair of pulleys so formed and positioned as to permit the interposition of a plurality of tanks therebetween; a belt including conductive material and extending over said pulleys, one lap of said belt passing above said tanks and a return lap thereof passing below said tanks; and work-receiving elements so secured as to extend upward from said return lap, favorably to the positioning of pieces to be plated thereon,—said belt being provided with current supply devices which are effective also to depress the same toward said tanks sufficiently to immerse said pieces and the supply devices of one tank being of opposite polarity from those of another tank, said belt being at an intermediate potential.

7. In an organization suitable for use in chromium-plating numerous separate pieces: a tank sufficiently elevated to permit passage of one lap of a belt therebelow; a belt comprising laps which respectively pass above and below said tank; means for supporting and advancing said belt; piece-receiving elements so secured to said belt as to project upwardly from the lower lap thereof and downwardly from the upper lap thereof; and means for conducting electricity through some of said piece-receiving elements, through pieces carried thereby, and through the solution in said tank.

8. In an organization suitable for use in chromium-plating numerous separate pieces: a tank sufficiently elevated to permit passage of one lap of a belt therebelow; a belt comprising laps which respectively pass above and below said tank; means for supporting and advancing said belt; piece-receiving elements so secured to said belt as to project upwardly from the lower lap thereof and downwardly from the upper lap thereof; and means for conducting electricity through some of said piece-receiving elements, through pieces carried thereby, and through the solution in said tank,—said belt being conductive and some of said supporting and advancing means being substantially nonconductive.

9. In an organization suitable for use in chromium-plating numerous separate pieces: a tank sufficiently elevated to permit passage of one lap of a belt therebelow; a belt comprising laps which respectively pass above and below said tank; means for supporting and advancing said belt; piece-receiving elements so secured to said belt as to project upwardly from the lower lap thereof and downwardly from the upper lap thereof; and means for conducting electricity through some of said piece-receiving elements, through pieces carried thereby, and through the solution in said tank,—said conducting means including current-carrying rollers above said tank and said belt.

10. In an organization suitable for use in chromium-plating numerous separate pieces: a tank sufficiently elevated to permit passage of one lap of a belt therebelow; a belt comprising laps which respectively pass above and below said tank; means for supporting and advancing said belt; piece-receiving elements so secured to said belt as to project upwardly from the lower lap thereof and downwardly from the upper lap thereof; and means for conducting electricity through some of said piece-receiving elements, through pieces carried thereby, and through the solution in said tank,—said conducting means including current-carrying rollers, above said tank and said belt, some of which are disposed at such a level, obviating immersion of said belt, as to assure immersion, in said tank, of pieces carried by said piece-receiving elements.

11. In an organization suitable for use in chromium-plating numerous separate pieces: a tank sufficiently elevated to permit passage of one lap of a belt therebelow; a belt comprising laps which respectively pass above and below said tank; means for supporting and advancing said belt; piece-receiving elements so secured to said belt as to project upwardly from the lower lap thereof and downwardly from the upper lap thereof; and means for conducting electricity through some of said piece-receiving elements through pieces carried thereby and through the solution in said tank,—said conductive means including brushes supported above said tanks and in conductive relationship to said belt.

12. In an organization suitable for use in chromium-plating numerous separate pieces: a plurality of tanks sufficiently elevated to permit passage of a lap of a belt therebelow;

a belt comprising laps which respectively pass above and below said tank; means for supporting and advancing said belt; piece-receiving elements so secured to said belt as to project upwardly from the lower lap thereof and downwardly from the upper lap thereof; and means for conducting electricity through some of said piece-receiving elements, through pieces carried thereby, and through the solution in said tank,—the direction of current in one of said tanks being reversed relatively to that in another of said tanks.

13. In an organization suitable for use in chromium-plating numerous separate pieces: a tank sufficiently elevated to permit passage of one lap of a belt therebelow; a belt comprising laps which respectively pass above and below said tank; means for supporting and advancing said belt; piece-receiving elements so secured to said belt as to project upwardly from the lower lap thereof and downwardly from the upper lap thereof; and means for conducting electricity through some of said piece-receiving elements, through pieces carried thereby, and through the solution in said tank,—said belt being transversely conductive.

14. In an organization suitable for use in chromium-plating numerous separate pieces: a tank sufficiently elevated to permit passage of one lap of a belt therebelow; a belt comprising laps which respectively pass above and below said tank; means for supporting and advancing said belt piece-receiving elements so secured to said belt as to project upwardly from the lower lap thereof and downwardly from the upper lap thereof; and means for conducting electricity through some of said piece-receiving elements, through pieces carried thereby, and through the solution in said tank,—said belt being longitudinally conductive.

In testimony whereof I affix my signature.

HECTOR RABEZZANA.